United States Patent
Navrátil et al.

(10) Patent No.: US 12,143,292 B2
(45) Date of Patent: Nov. 12, 2024

(54) METHODS AND APPARATUSES FOR CONFIGURATION OF USER DEVICE(S) FOR RECEPTION OF POINT-TO-MULTIPOINT TRANSMISSION

(71) Applicant: NOKIA TECHNOLOGIES OY, Espoo (FI)

(72) Inventors: David Navrátil, Helsinki (FI); Benoist Pierre Sebire, Tokyo (JP); Philippe Godin, Versailles (FR); Esa Mikael Malkamäki, Espoo (FI); Jarkko Tuomo Koskela, Oulu (FI); Horst Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 4 days.

(21) Appl. No.: 18/092,124

(22) Filed: Dec. 30, 2022

(65) Prior Publication Data

US 2023/0216776 A1 Jul. 6, 2023

Related U.S. Application Data

(60) Provisional application No. 63/297,062, filed on Jan. 6, 2022.

(51) Int. Cl.
- G06F 15/16 (2006.01)
- H04L 45/16 (2022.01)
- H04W 72/30 (2023.01)

(52) U.S. Cl.
CPC ............ *H04L 45/16* (2013.01); *H04W 72/30* (2023.01)

(58) Field of Classification Search
CPC .............................. H04L 45/16; H04L 12/189
See application file for complete search history.

(56) References Cited

U.S. PATENT DOCUMENTS

2019/0174460 A1* 6/2019 Zhang ................... H04W 72/30
2022/0132277 A1* 4/2022 Shrivastava ............ H04W 4/06
(Continued)

OTHER PUBLICATIONS

3GPP TS 38.300 V16.8.0 (Dec. 2021), Technical Specification, 3rd Generation Partnership Project; Technical Specification Group Radio Access Network; NR; NR and NG-RAN Overall Description; Stage 2 (Release 16), Dec. 2021.
3GPP TS 38.331 V16.7.0 (Dec. 2021), Technical Specification, 3rd Generation Partnership Project; Technical Specification Group Radio Access Network; NR; Radio Resource Control (RRC) protocol specification (Release 16), Dec. 2021.
(Continued)

*Primary Examiner* — Hieu T Hoang
(74) *Attorney, Agent, or Firm* — SQUIRE PATTON BOGGS (US) LLP

(57) ABSTRACT

Systems, methods, apparatuses, and computer program products for the configuration of user device(s) for reception of point-to-multipoint transmission are provided. One method may include receiving, at a user equipment, a configuration for point-to-multipoint reception of a group-common transport channel. The configuration may include a group-common signaling configuration for a group of user equipment. The method may also include receiving, at the user equipment, a point-to-multipoint reconfiguration message using the group-common signaling configuration on the group-common transport channel from a device (e.g., a network node). The point-to-multipoint reconfiguration message may include an updated point-to-multipoint configuration. The method may then include receiving point-to-multipoint data, from the device on the group-common transport channel, based on the updated point-to-multipoint configuration.

18 Claims, 8 Drawing Sheets

(56) References Cited

U.S. PATENT DOCUMENTS

| | | | | |
|---|---|---|---|---|
| 2022/0312377 | A1* | 9/2022 | Takeda | H04L 1/1822 |
| 2023/0076769 | A1* | 3/2023 | Byun | H04L 1/1812 |
| 2023/0091236 | A1* | 3/2023 | Fujishiro | H04W 76/40 370/329 |
| 2023/0099695 | A1* | 3/2023 | Kang | H04W 76/40 370/312 |
| 2023/0134356 | A1* | 5/2023 | Zhang | H04W 4/06 370/312 |
| 2023/0155741 | A1* | 5/2023 | Jang | H04L 1/1864 370/312 |
| 2023/0239661 | A1* | 7/2023 | Pham Van | H04W 68/02 370/329 |
| 2023/0300682 | A1* | 9/2023 | Pham Van | H04W 4/06 370/312 |
| 2023/0354153 | A1* | 11/2023 | Liu | H04W 76/28 |
| 2023/0362721 | A1* | 11/2023 | Dai | H04L 1/1685 |
| 2023/0389048 | A1* | 11/2023 | Dai | H04L 5/0044 |
| 2023/0389049 | A1* | 11/2023 | Kim | H04W 4/06 |
| 2023/0397299 | A1* | 12/2023 | Dai | H04W 4/06 |
| 2023/0403760 | A1* | 12/2023 | Pham Van | H04W 76/19 |
| 2024/0031066 | A1* | 1/2024 | Shirivastava | H04W 4/06 |
| 2024/0064591 | A1* | 2/2024 | Babaei | H04W 36/0088 |
| 2024/0137826 | A1* | 4/2024 | Shimoda | H04W 4/06 |
| 2024/0187960 | A1* | 6/2024 | Shimoda | H04W 40/02 |

OTHER PUBLICATIONS

3GPP TS 38.473 V16.8.0 (Dec. 2021), Technical Specification, 3rd Generation Partnership Project; Technical Specification Group Radio Access Network; NG-RAN; F1 application protocol (F1AP) (Release 16), Dec. 2021.

Huawei et al., "WID Revision: NR Multicast and Broadcast Services," RP-201038, 3GPP TSG RAN Meeting #88-e, E-Meeting, Jun. 29-Jul. 3, 2020.

Ericsson, "Protocol structure and bearer modelling for NR MBS," R2-2007631, 3GPP TSG-RAN WG2 #111e, Electronic Meeting, Aug. 17-28, 2020.

3GPP TS 36.300 V16.3.0 (Sep. 2020), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Sep. 2020.

3GPP TS 36.331 V16.7.0 (Dec. 2021), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Dec. 2021.

3GPP TSG-RAN WG2 Meeting #112e Electronic, Nov. 2-13, 2020, Summary of Email Discussion [Post111-e][906][MBS] Idle mode support. R2-2008796. pp. 1-58.

* cited by examiner

METHODS AND APPARATUSES FOR CONFIGURATION OF USER DEVICE(S) FOR RECEPTION OF POINT-TO-MULTIPOINT TRANSMISSION

RELATED APPLICATION

This application claims priority from U.S. Provisional Application No. 63/297,062, filed on Jan. 6, 2022, which is hereby incorporated by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems, apparatus, computer program products and/or methods for the configuration of user device(s) for reception of point-to-multipoint transmission.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system may built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may include a method that may include receiving, at a user equipment from a device, a configuration for point-to-multipoint reception of a group-common transport channel. The configuration may include a group-common signaling configuration for a group of user equipment. The method may also include receiving, at the user equipment, a point-to-multipoint reconfiguration message using the group-common signaling configuration on the group-common transport channel from the device. The point-to-multipoint reconfiguration message may include an updated point-to-multipoint configuration. The method may then include receiving point-to-multipoint data, from the device on the group-common transport channel, based on the updated point-to-multipoint configuration.

An embodiment may include a method that may include transmitting, by a device to at least one user equipment, a configuration for point-to-multipoint reception of a group-common transport channel. The configuration may include a group-common signaling configuration for a group of user equipment. The method may also include transmitting, by the device, a point-to-multipoint reconfiguration message using the group-common signaling configuration on the group-common transport channel to the group of user equipment. The point-to-multipoint reconfiguration message may include an updated point-to-multipoint configuration. The method may also include transmitting, by the device, point-to-multipoint data on the group-common transport channel.

An embodiment may include an apparatus including at least one processor and at least one memory comprising computer program code. The at least one memory and computer program code may be configured, with the at least one processor, to cause the apparatus at least to receive, from a device, a configuration for point-to-multipoint reception of a group-common transport channel. The configuration may include a group-common signaling configuration for a group of user equipment. The at least one memory and computer program code may also be configured, with the at least one processor, to cause the apparatus at least to receive a point-to-multipoint reconfiguration message using the group-common signaling configuration on the group-common transport channel from the device. The point-to-multipoint reconfiguration message may include an updated point-to-multipoint configuration. The at least one memory and computer program code may also be configured, with the at least one processor, to cause the apparatus at least to receive point-to-multipoint data, from the device on the group-common transport channel, based on the updated point-to-multipoint configuration.

An embodiment may include an apparatus including at least one processor and at least one memory comprising computer program code. The at least one memory and computer program code may be configured, with the at least one processor, to cause the apparatus at least to transmit, to at least one user equipment, a configuration for point-to-multipoint reception of a group-common transport channel. The configuration may include a group-common signaling configuration for a group of user equipment. The at least one memory and computer program code may also be configured, with the at least one processor, to cause the apparatus at least to transmit a point-to-multipoint reconfiguration message using the group-common signaling configuration on the group-common transport channel to the group of user equipment. The point-to-multipoint reconfiguration message may include an updated point-to-multipoint configuration. The at least one memory and computer program code may also be configured, with the at least one processor, to cause the apparatus at least to transmit point-to-multipoint data on the group-common transport channel.

An embodiment may include an apparatus including means for receiving a configuration for point-to-multipoint reception of a group-common transport channel. The configuration may include a group-common signaling configuration for a group of user equipment. The apparatus may also include means for receiving a point-to-multipoint reconfiguration message using the group-common signaling configuration on the group-common transport channel from a device. The point-to-multipoint reconfiguration message may include an updated point-to-multipoint configuration. The apparatus may also include means for receiving point-to-multipoint data, from the device on the group-common transport channel, based on the updated point-to-multipoint configuration.

An embodiment may include an apparatus including means for transmitting, to at least one user equipment, a configuration for point-to-multipoint reception of a group-common transport channel. The configuration may include a group-common signaling configuration for a group of user equipment. The apparatus may also include means for transmitting a point-to-multipoint reconfiguration message using the group-common signaling configuration on the group-common transport channel to the group of user equipment. The point-to-multipoint reconfiguration message may include an updated point-to-multipoint configuration. The apparatus may also include means for transmitting point-to-multipoint data on the group-common transport channel.

BRIEF DESCRIPTION OF THE DRAWINGS

For proper understanding of example embodiments, reference should be made to the accompanying drawings, wherein.

DETAILED DESCRIPTION

Figure 1:
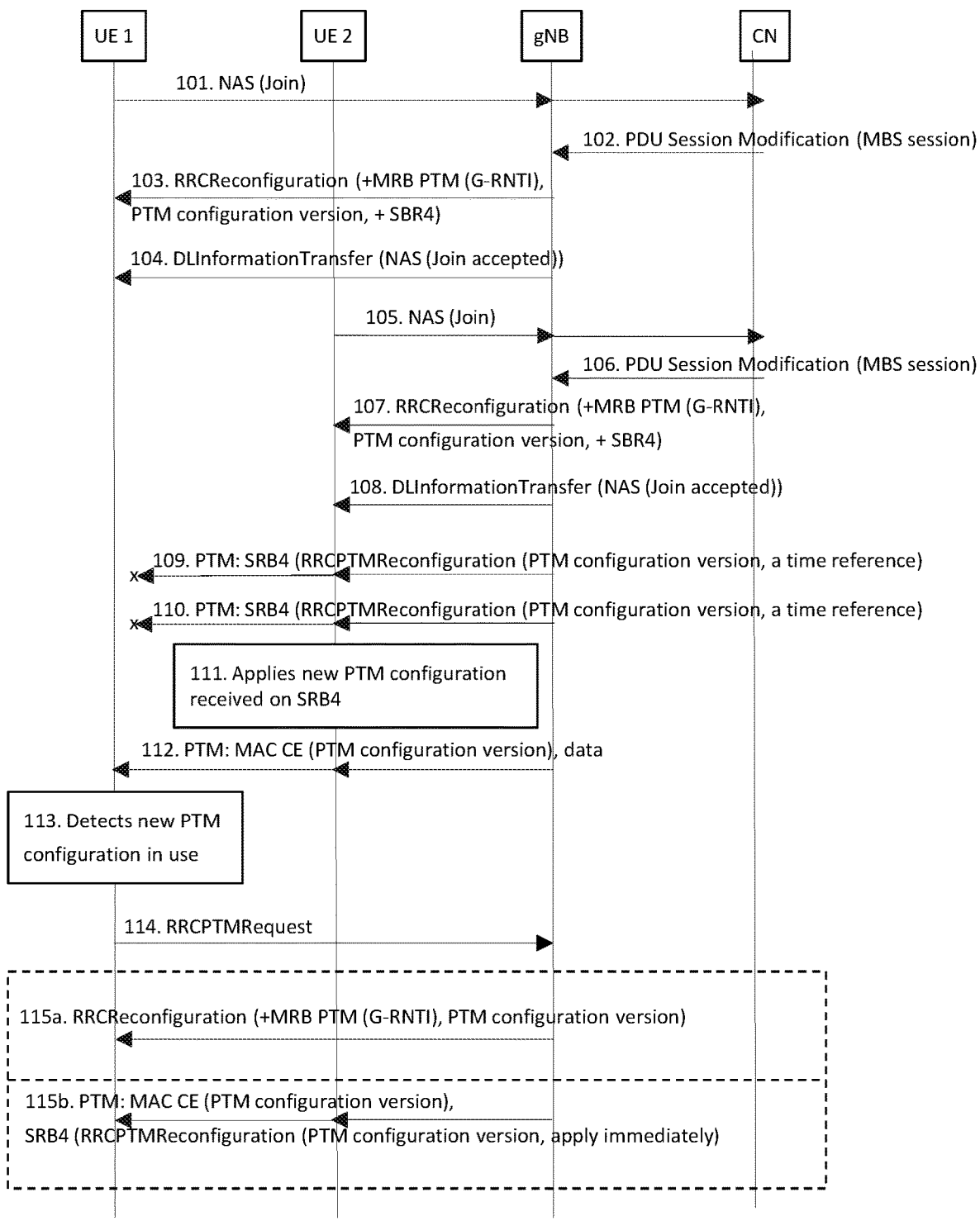
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the configuration of user device(s) for reception of point-to-multipoint (PTM) transmission, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Additionally, it is noted that the terms "cell", "node", "gNB", or other similar language throughout this specification may be used interchangeably according to certain example embodiments.

Multicast and broadcast services (MBS) may be supported in some communication systems, e.g., the 3rd Generation Partnership Project (3GPP) Release-17. Two delivery modes may be introduced. The first delivery mode could be used for high quality of service (QoS) (reliability, latency) requirement, for user equipment (UE) in connected state (possibly in which the UE can switch to other states when there is no data reception). A second delivery mode may be used for "low" QoS requirement, where the UE can also receive data in inactive or idle state. It may be assumed that the first delivery mode (i.e., delivery mode 1) is used for multicast sessions, and the second delivery mode (i.e., delivery mode 2) is used for broadcast sessions. The applicability of delivery mode 2 to multicast sessions is yet to be determined.

A multicast control channel (MCCH) may be used for the configuration of UEs, e.g., for delivery mode 2. The MCCH may be mapped to the downlink (DL)-shared channel (SCH) for NR MBS delivery mode 2. The two-step based approach (i.e., broadcast control channel (BCCH) and MCCH) as adopted by LTE single cell (SC) point-to-multipoint (PTM) may be reused for the transmission of PTM configuration for NR MBS delivery mode 2.

Using multiple UE dedicated signaling for (re-)configuring of a large group of UEs with updated PTM configuration (e.g., PTM leg of MBS radio bearer) results in high signaling load and high latency of reconfiguration. The high signaling load and high latency issues can be avoided if the network reconfigures the group of UEs using a MCCH configuration message addressed to all UEs in the group. However, MCCH reception requires the UE to perform additional actions such as physical downlink control channel (PDCCH) monitoring for the MCCH information change notification and subsequently acquisition of MCCH, in addition to PTM data reception on a PTM transport channel, which impacts a UE's power consumption as these operations may not be aligned with UE's discontinuous reception (DRX) pattern(s). Thus, there is a need for providing a more efficient way of group reconfiguration.

Certain example embodiments can provide methods of PTM configuration and/or reconfiguration. In an embodiment, a UE may be initially configured for PTM reception (e.g., MBS radio bearer (MRB) with PTM leg), for example via dedicated signaling including a radio network temporary identity for the reception of group-common channel (e.g., G-RNTI). According to certain example embodiments, the UE may be configured with a new signaling radio bearer (SRB), which may be referred to herein as SRBx. The SRBx is common for a group of UEs. The SRBx could be sent in a PTM transport channel. In some embodiments, the SRBx is associated with its own logical channel identity, allowing multiplexing with other logical channels in one PTM transport block. A UE can receive an updated PTM configuration, e.g., as a PTM radio resource control (RRC) reconfiguration message, on the group-common SRB. In some embodiments, if encryption or integrity protection is needed for the new SRB, one or more new group specific security keys may be configured (and specified). If neither encryption nor integrity protection are configured, then the list of possible updated PTM configurations carried via SRBx may be limited (either via dedicated configuration, broadcast or through specification). As described above, the group-common SRB may be referred to herein as SRBx. Further, in some examples discussed below, such as in FIGS. 1-5, SRBx may be depicted as SRB4. However, SRB4 should be understood to represent just one example of the group common SRB and other examples or representations are possible according to further embodiments.

In an embodiment, upon reception of a PTM RRC reconfiguration message on SRBx, the UE does not reply with an RRC message but applies the new configuration. The UE may apply the new configuration based on a time reference (e.g., system frame) indicated in the message received on SRBx. Alternatively, in one embodiment, the PTM RRC reconfiguration message on SRBx may contain a request for individual UE replies, and the UE provides a reply message in response to the reconfiguration.

According to certain embodiments, the network may (blindly) retransmit the PTM RRC reconfiguration message on SRBx to increase the probability that the message is received by the UE(s). The retransmission can be a hybrid automatic repeat request (HARQ) retransmission (e.g., if the PTM RRC reconfiguration message is sent alone in a transport block), or can be a retransmission of the packet data convergence protocol (PDCP) protocol data unit (PDU) in which case PDCP duplicate detection/discard takes care of duplicates on the receiver side. In some embodiments, the PTM RRC reconfiguration message may include a version flag to indicate a version of the new PTM configuration. In certain embodiments, the version flag can have multiple values or multiple bits.

In an embodiment, the network may include, in one or more PTM transport blocks received on group-common transport channel scheduled by G-RNTI, an indication (e.g., a Media Access Control (MAC) control element (CE)) of the version of PTM RRC configuration in use. For example, the indication may include at least one bit indication that may change when the network is using new RRC configuration after a reference time.

In a further embodiment, the network may send a MAC CE with an indication of the new PTM configuration version to be used even before the new PTM configuration is applied, which allows the UE to request the new PTM configuration if the UE missed SRBx transmission of the new PTM configuration. In this case, an indication that the new PTM configuration has not been applied yet or the time reference may be included in the message to indicate to the UE that it can continue receiving PTM using the current PTM configuration and thus not amending its operation as proposed below. For example, in one embodiment, the network may start sending MAC CE with the new PTM configuration version after the transmission RRC message (RRCPTMReconfiguration) on SRBx until the time reference when the new PTM configuration is applied and continue the transmission of the MAC CE with the new PTM configuration version for implementation specific time after the time reference.

According to certain embodiments, if the UE receives a PTM transport block including an indication of a version of PTM RRC configuration that the UE did not receive, the UE may refrain from performing any uplink feedback related to the PTM transmission (e.g., HARQ feedback) and/or the UE may request the network to provide the UE with the PTM configuration of the indicated version, e.g., by transmitting an RRC PTM Request message.

In an embodiment, after the network applies the new configuration included in the PTM RRC reconfiguration message and if the UE did not receive the PTM RRC reconfiguration message, the UE may not be able to receive the PTM transmission on group-common transport channel any more. The UE may detect an interruption of multicast data at upper layers caused by this event. The upper layers then may request a RRC entity in the UE to send the request (e.g., RRC PTM Request message) for the new PTM configuration.

According to some embodiments, in case of a distributed RAN configuration (i.e., a central unit (CU)— distributed unit (DU) split), the need to change PTM configuration may be triggered (e.g., by layer 1 (L1) operation) at the DU. An embodiment may provide a new class 1 procedure from DU to CU requesting MBS Information Update or PTM configuration update or, alternatively, use a class 1 procedure such as the gNB-DU Configuration update which would newly include the updated PTM configuration. It is noted that a class 1 procedure may refer to a procedure that includes an initial message (e.g., a request) and a response message (e.g., a response or acknowledgement). Alternatively, in an embodiment, a class 2 procedure can be used. It is noted that a class 2 procedure may refer to a procedure that includes a single message, i.e., where there is no response or acknowledgement message.

FIG. 1 illustrates an example signaling diagram depicting SRBx configuration and PTM reconfiguration using SRBx, according to certain example embodiments. As noted above, in some example embodiments, such as in FIG. 1, SRBx may be depicted as SRB4. However, SRB4 should be understood to represent just one example of the group common SRB and other examples or representations are possible according to additional example embodiments. The example of FIG. 1 may include signaling between a UE1, a UE2, a gNB and a core network (CN) node. As illustrated in the example of FIG. 1, at 101, UE1 may transmit a non-access stratum (NAS) (join) message to the gNB and/or CN. At 102, the CN may transmit a PDU session modification for a MBS session. At 103, the gNB may transmit a RRC reconfiguration message to configure the UE1 for reception of PTM transmission. For example, the reconfiguration message may comprise configurations for one or more of the following: a group-common transport channel, which may further include information about a portion of cell's bandwidth where the PTM transmission may be scheduled (this may be referred to as a common frequency resource), group-common physical downlink control channel (PDCCH), group-common physical downlink shared channel (PDSCH), MRB comprising PTM leg for user data reception, a group-common signaling configuration (e.g., a signaling radio bearer (SRB4)) and corresponding G-RNTI needed for the PTM reception of the group-common transport channel. The message transmitted at 103 may include an indication of PTM configuration version. As the message transmitted at 103 is a dedicated message, the time reference when to apply PTM configuration may not be present. If the time reference is not present, the UE1 can receive PTM traffic using new configuration including PTM within a predefined time limit, e.g. 10 ms. The gNB may also configure at 103 a new SRB4. In an embodiment, SRB4 can be multiplexed with MRB and addressed by the G-RNTI. As also illustrated in the example of FIG. 1, at 104, the gNB may transmit a DL information transfer message to UE1 indicating that the NAS join is accepted.

In the example of FIG. 1, at 105, UE2 may transmit a non-access stratum (NAS) (join) message to the gNB and/or CN. At 106, the CN may transmit a PDU session modification for a MBS session. As further illustrated in the example of FIG. 1, at 107, the gNB may transmit a RRC reconfiguration message to configure the UE2 with MRB comprising PTM leg and corresponding G-RNTI needed for the PTM reception of the group-common channel. The message transmitted at 107 may include an indication of PTM configuration version. Similar to the discussion above regarding the message transmitted at 103, the message transmitted by the gNB at 107 may be a dedicated message and the time reference when to apply PTM configuration may not be present. If the time reference is not present, the UE2 can receive using the new configuration including PTM within a predefined time limit, e.g., 10 ms. Again, the gNB may also configure the new SRB4 for UE2. As mentioned above, SRB4 can be multiplexed with MRB and addressed by the G-RNTI. As also illustrated in the example of FIG. 1, at 108, the gNB may transmit a DL information transfer message to UE2 indicating that the NAS join is accepted.

In the example of FIG. 1, at 109, the gNB may transmit PTM transmission on the group-common channel addressed by the G-RNTI including a RRC PTM Reconfiguration message sent over SRB4. The reconfiguration message may comprise a PTM configuration version which value is different from the value included at 103 and 107. As shown at 110, the gNB may retransmit the same information as transmitted at 109.

In the example of FIG. 1, UE2 may correctly receive at least one PTM transmission including the RRC PTM Reconfiguration message and, as shown at 111, may apply a new PTM configuration. In some embodiments, the UE2 may apply the new PTM configuration from an indicated time reference (e.g., system frame) provided in the RRC PTM Reconfiguration message received on SRB4. However, in the example of FIG. 1, UE1 may have failed to receive the PTM transmissions at 109 and 110, and therefore UE1 did not receive the new PTM configuration.

As illustrated in the example of FIG. 1, at 112, the gNB may transmit a medium access control (MAC) control element (CE) including a PTM configuration version and/or data to UE1 and/or UE2. In some embodiments, the MAC CE is sent to a group of UEs including UE1 and UE2 via a PTM transport channel. At 113, UE1 may detect that a new PTM configuration is applied by the gNB based on the PTM configuration version received at 112. The PTM configuration version may have the same value as indicated at 109 and 110 and different from the version of the PTM configuration in use at the UE1 (since UE1 failed to receive at 109 and 110). In an embodiment, at 114, UE1 may transmit the RRC PTM Request message to the gNB to request the new PTM configuration.

According to certain embodiments, the gNB may either send the new PTM configuration over dedicated RRC signaling to UE1, as shown at 115a, or, if the gNB received multiple RRC PTM Request messages from different UEs, then the gNB may use SRB4 again to send the new PTM configuration to a group of UEs including UE1 and UE2, as shown at 115b. If the PTM configuration sent at 115b is the same as the PTM configuration sent at 109 and 110, the same PDCP SN may be used as in 109 and 110. Then, the UEs (e.g., UE2 in the figure) that already received the configuration may discard the PDCP PDU as a duplicate.

Figure 2:
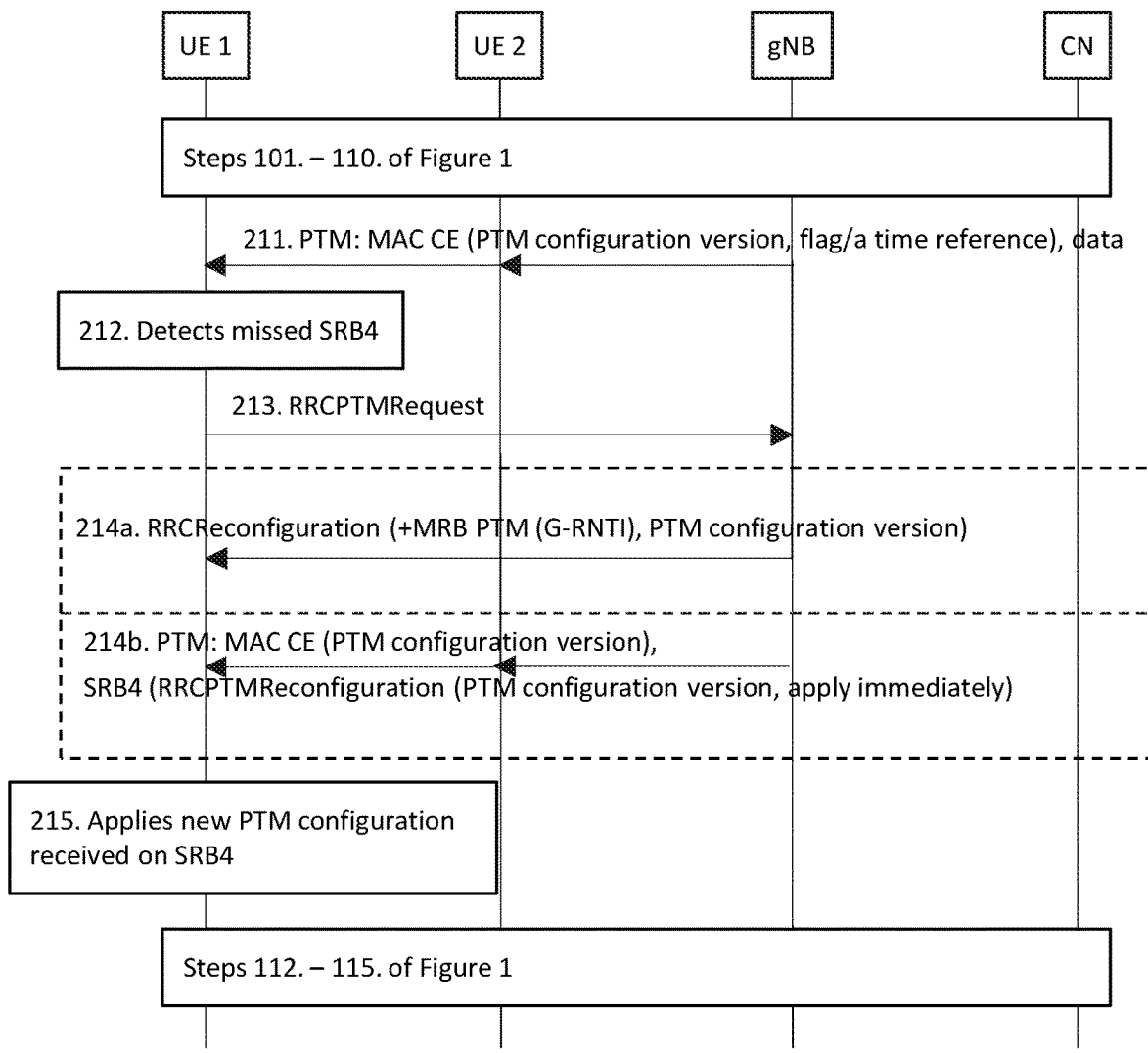
FIG. 2 illustrates an example signaling diagram, according to an embodiment.

FIG. 2 illustrates another example signaling diagram for detecting a missed SRBx transmission before the new PTM configuration is applied, according to an example embodiment. More specifically, FIG. 2 illustrates an example of an alternative in which the UE detects a missing SRBx (e.g., SRB4) transmission based on a received MAC CE with the new PTM configuration version and a flag or a time reference before the new PTM configuration is applied. As illustrated in the example of FIG. 2, procedures 101 to 110 from FIG. 1 may be performed. Then, at 211, the gNB may transmit, to UE1 and/or UE2, a MAC CE with the new PTM configuration version. In some embodiments, the gNB may also indicate a new flag or time reference at 211. The time reference may indicate a time point to apply the new PTM configuration version. In some examples, the time reference may not be present in the message at 211, and the UE may determine if the signaled version is used or to be used based on the flag. That is, the flag can indicate whether the update configuration is used for this PTM transmission or not. If the updated PTM configuration associated with the signaled version is used, then the UE may refrain from related UL activity and/or requests PTM configuration 213. If the flag indicates "to be used," then the UE may perform the UL operation for related PTM transmission. In some embodiments, the MAC CE may be sent to a group of UEs including UE1 and UE2 via a PTM transport channel. Based on the version indication in the MAC CE, UE1 detects at 212 that a SRB4 with new PTM configuration was missed. Upon the detection of missed SRB4 transmission at 212, the UE1 may detect that a SRB4 with new PTM configuration was missed, and it may make a request for the new PTM configuration, e.g., by transmitting RRC PTM Request, as shown at 213.

In the example of FIG. 2, according to some embodiments, the gNB may transmit the new PTM configuration over dedicated RRC signaling to UE 1, as shown at 214a, or, if the gNB received multiple RRC PTM Request messages, then the gNB may use SRB4 again to send the new PTM configuration to a group of UEs, as shown at 214b. If the PTM configuration sent in step 214b is the same as the PTM configuration sent earlier in procedures 109 and 110, the same PDCP SN may be used as in procedures 109 and 110. Then, the UEs (e.g., UE2 in the figure) that already received the configuration may discard the PDCP PDU as a duplicate. At 215, the UE1 may apply the new PTM configuration received. As further illustrated in the example of FIG. 2, the procedures 112 to 115 from FIG. 1 may be performed. However, the procedures 112 to 115 from FIG. 1 may not be needed if all the UEs already received the new PTM configuration either at 109 or 110 or 214a or 214b.

Figure 3:
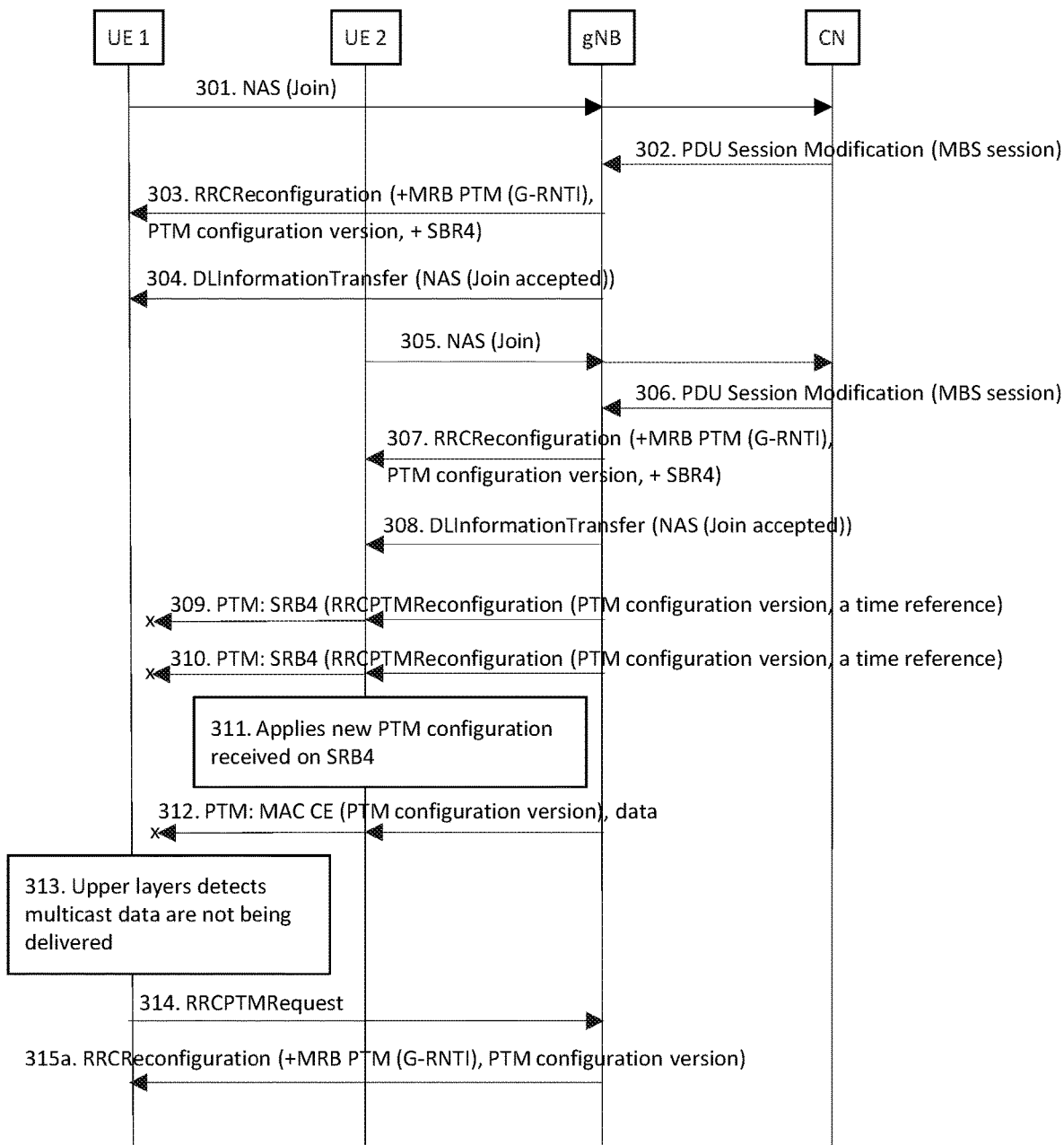
FIG. 3 illustrates an example signaling diagram, according to an embodiment.

FIG. 3 illustrates another example signaling diagram for PTM reconfiguration with SRBx preventing reception of PTM for UEs that missed the new PTM configuration, according to an example embodiment. It is noted that procedures 301-311 and 315a of FIG. 3 may be similar to procedures 101-111 and 115a in FIG. 1 discussed above. However, the new PTM configuration may be such that the UE1 is not able to receive PTM transmission after the gNB applies the new PTM configuration, and the MAC CE including the PTM configuration version indication transmitted via PTM transport channel is not received by UE1 as shown at 312 in the example of FIG. 3. In such a case, at 313, upper layers of UE1 may detect that the delivery of multicast data has been interrupted and indicate this to RRC layer, causing the UE1 to request PTM configuration, e.g., by transmitting an RRC PTM Request message, as shown at 314 in FIG. 3. It is noted that retransmission of the new PTM configuration may not use SRB4 (procedure 115b in FIG. 1) in this case, but use a dedicated signaling for UE1, as shown at procedure 315a in FIG. 3.

It should be appreciated that FIGS. 1-3 are just provided as examples without limitation. In some other embodiments, the gNB in FIGS. 1-3 may be replaced with another device, e.g., a user equipment. That is, in certain embodiments, UE1 and UE2 in FIGS. 1-3 may receive PTM (re)configuration and PTM data from another user equipment.

In some embodiments, the network node configuring the PTM reception for the UE may be implemented in a distributed way, and may include a DU and a CU. Some example embodiments may include the establishment of SRB4 in the DU. According to an embodiment, the CU can request establishment of SRB4 using F1 UE context modification procedure, e.g., when the UE joins a multicast MBS session using UE associated signalling. Alternatively or additionally, in an embodiment, the CU may request the establishment of SRB4 for a group of UEs using F1 non-UE associated signalling and including the identity of multicast MBS session at any point of time. It should be noted that, according to certain embodiments, just one SRB4 is required regardless of how many multicast MBS sessions the UE joined.

Figure 4:
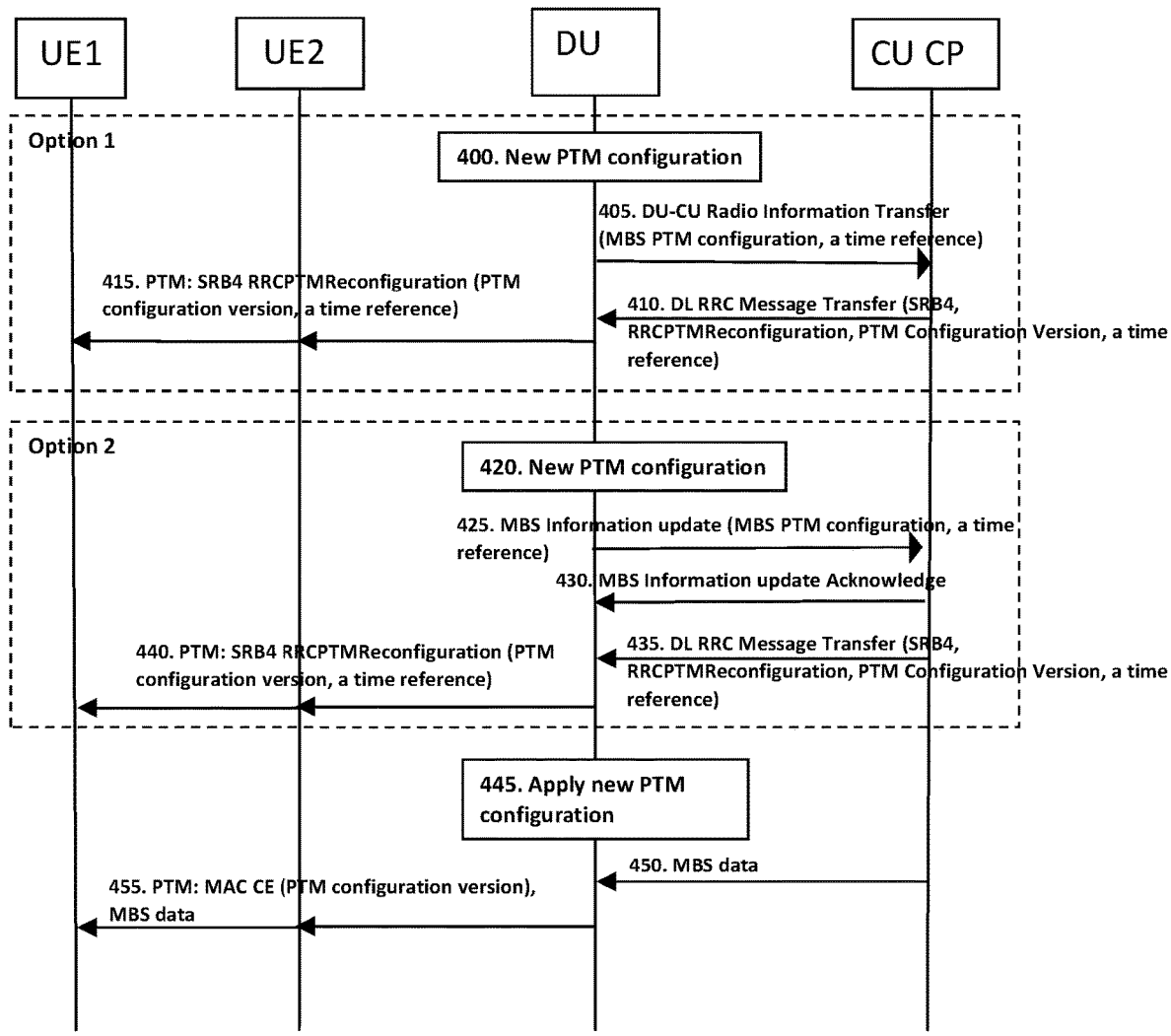
FIG. 4 illustrates an example signaling diagram, according to an embodiment.

An embodiment may be directed to the modification of MBS PTM configuration with SRB4 initiated by DU. FIG. 4 illustrates an example signaling diagram for a DU triggered PTM configuration change followed by group reconfiguration, according to an example embodiment. The signaling diagram depicted in FIG. 4 illustrates an example using a class 2 procedure (Option 1), or an example using a new class 1 procedure (Option 2).

As illustrated in the example of FIG. 4, in Option 1, the DU may decide to apply a new PTM configuration at 400. According to some embodiments, the DU may send the new PTM configuration to CU control plane (CP) in a non-UE associated F1AP procedure. In certain embodiments, the DU may utilize a class 2 procedure. For instance, as shown at 405, the DU may use a DU-CU Radio Information Transfer to send a MBS PTM configuration to the CU. In some embodiments, the DU also send to the CU at 405 a time reference to indicate when it would like the new PTM configuration to be applied. As illustrated at 410, the CU CP may provide a DL RRC message transfer with a DL RRC group reconfiguration message. The CU CP may include the new PTM configuration into the RRC group reconfiguration message. As mentioned above, the DU may propose a time reference when it would like the new PTM configuration to be applied. However, in certain embodiments, the CU may use the received time reference or the CU may determine to use a different time reference and indicate it in the message at 410. In an embodiment, the DU may apply the new PTM configuration at the time indicated in the time reference in the DL RRC message transfer received at 410. Alternatively or additionally, in certain embodiments, the PTM configuration version may be determined by the CU and included in the DL RRC Message transfer. According to certain embodiments, a new F1 DL RRC message transfer which is non-UE associated may be provided, or it may be possible to reuse UE-associated F1 DL RRC message transfer of one of the UEs in the group. As illustrated at 415, the DU may transmit, to UE1 and/or UE2, a SRB4 carrying the RRC PTM reconfiguration message. In some embodiments, the RRCPTMReconfiguration message may also include at least one of the PTM configuration version and/or time reference.

As further illustrated in the example of FIG. 4, in Option 2, the DU may decide to apply a new PTM configuration at 420. In this embodiment, the DU may utilize a class 1 procedure, e.g., gNB-DU Configuration Update, or other procedure. For example, as illustrated at 425, the DU may transmit, to the CU CP, a MBS information update including the MBS PTM configuration. In some embodiments, the DU may also send a time reference for indicating when it would like the new PTM configuration to be applied. At 430, the CU CP may transmit and the DU may receive a MBS information update acknowledgement. Then, at 435, the CU CP may provide a DL RRC message transfer with a DL RRC group reconfiguration message. The CU CP may include the new PTM configuration into the RRC group reconfiguration message. In certain embodiments, the CU may use the received time reference or the CU may determine to use a different time reference and indicate it in the message at 435. In certain embodiments, the CU may determine to use a different time reference and indicate it to the DU already in the message at 430. Alternatively or additionally, in certain embodiments, the PTM configuration version may be determined by the CU and indicated at 435. As illustrated at 440, the DU may transmit, to UE1 and/or UE2, a SRB4 carrying the RRC PTM reconfiguration. In some embodiments, the RRCPTMReconfiguration message may also include at least one of the PTM configuration version and/or time reference.

As also illustrated in FIG. 4, at 445, the DU may apply the new PTM configuration and, at 450, may receive MBS data from the CU CP. At 455, the DU may transmit, to UE1 and/or UE2, a MAC CE including the PTM configuration version and MBS data.

Table 1 provided below depicts an example layout of a message update for the case where a DU-CU Radio Information Transfer message including a field of PTM Configuration is used for indicating new PTM configuration. This message may be sent by a gNB-DU to a gNB-CU to convey radio-related information.

TABLE 1

| Information Element (IE)/Group Name | Presence | Range | IE type and reference | Semantics description | Criticality | Assigned Criticality |
| --- | --- | --- | --- | --- | --- | --- |
| Message Type | Mandatory | | 9.3.1.1 | | YES | ignore |
| Transaction ID | Mandatory | | 9.3.1.23 | | YES | reject |
| CHOICE DU-CU Radio Information Type | Mandatory | | | | YES | ignore |
| >Remote Interference Management (RIM) | | | | | | |
| >>DU-CU RIM Information | Mandatory | | 9.3.1.91 | | — | — |

TABLE 1-continued

| Information Element (IE)/Group Name | Presence | Range | IE type and reference | Semantics description | Criticality | Assigned Criticality |
|---|---|---|---|---|---|---|
| >MBS | | | | | | |
| >>PTM Configuration | Mandatory | | 9.3.1.xx | | — | — |

Figure 5:
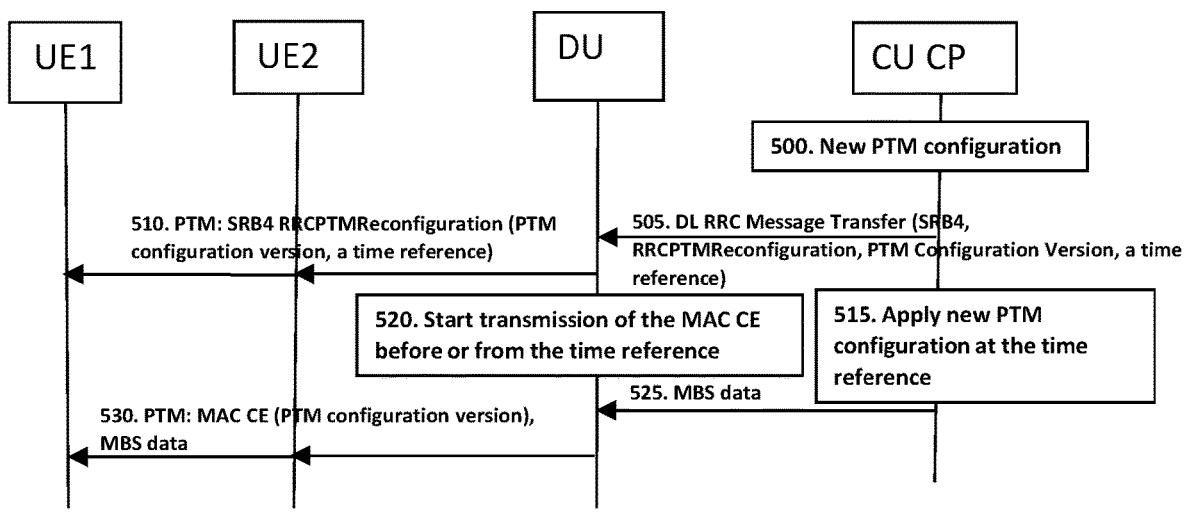
FIG. 5 illustrates an example signaling diagram, according to an embodiment.

An embodiment may include the modification of MBS PTM configuration with SRB4 initiated by CU. FIG. 5 illustrates an example signaling diagram for a CU initiated PTM configuration modification, according to certain embodiments. In this embodiment, reconfiguration of PDCP for MRB does not need to involve any changes to the lower layers. In this case, the CU may also determine a time reference when the new PTM configuration should be applied.

For example, as illustrated in FIG. 5, at 500, the CU CP may decide to apply a new PTM configuration. As illustrated at 505, the CU CP may provide, to the DU, a DL RRC message transfer including SRB4 and PTM reconfiguration. In some embodiments, the CU may also send at least one of PTM configuration version or a time reference to the DU at 505. At 510, the DU may transmit, to UE1 and/or UE2 on a PTM transport channel, a SRB4 carrying the RRC PTM reconfiguration. In some embodiments, the RRCPTMReconfiguration message may also include at least one of the PTM configuration version and the time reference at 510. As illustrated at 515, the CU CP may apply the new PTM configuration at the time reference. At 520, the DU may start transmission of the MAC CE before or from the time reference. At 525, the DU may receive MBS data from the CU CP. At 530, the DU may transmit, to UE1 and/or UE2, a MAC CE including the PTM configuration version. The MAC CE may be sent by multiplexing with the MBS data.

FIGS. 1-5 discussed above illustrate some examples according to certain embodiments. It should be noted that, according to some embodiments, the signaling diagrams shown in FIGS. 1-5 may be combined and/or modified. In other words, one or more of the procedures, messages or blocks depicted in FIGS. 1-5 may be combined or may be skipped, according to some embodiments. Therefore, FIGS. 1-5 illustrate examples of certain embodiments, but may be modified or changed according to other example embodiments.

Figure 6:
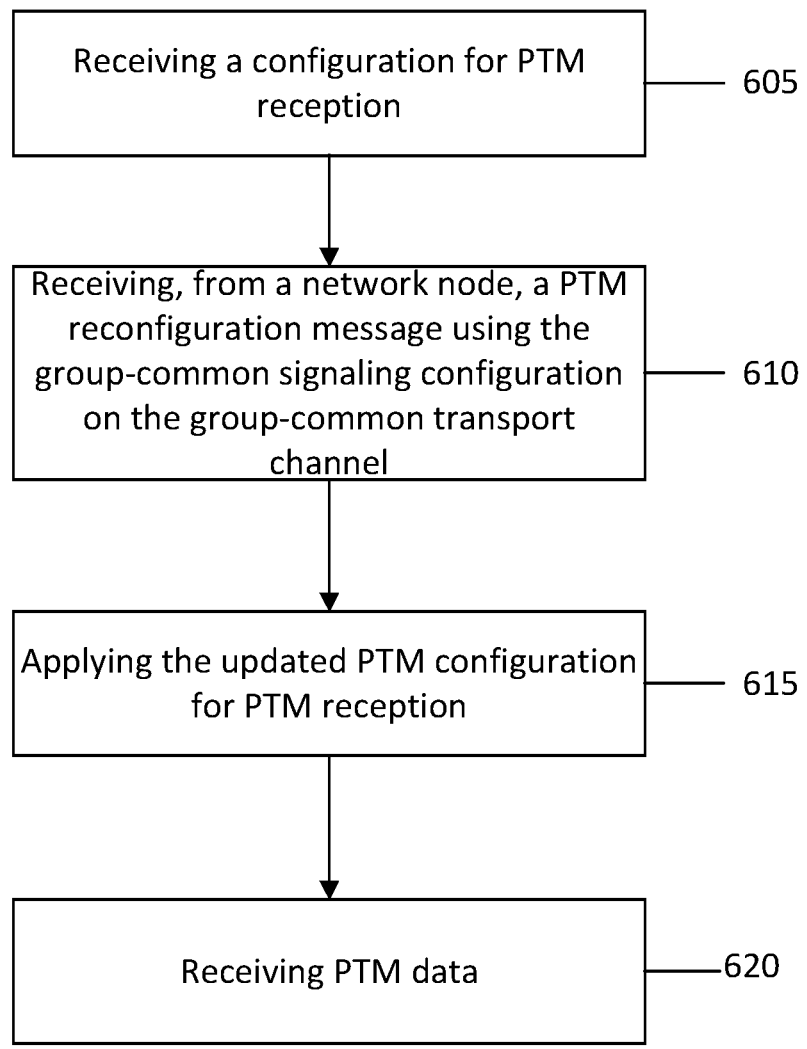
FIG. 6 illustrates an example flow diagram of a method, according to an embodiment.

FIG. 6 illustrates an example flow diagram of a method for reception of PTM transmission(s), according to an example embodiment. In certain example embodiments, the flow diagram of FIG. 6 may be performed by a network entity or communication device in a communications system such as, but not limited to, LTE or 5G NR. For instance, in some example embodiments, the communication device performing the method of FIG. 6 may include a UE, sidelink (SL) UE, wireless device, mobile station, IoT device, UE type of roadside unit (RSU), a wireless transmit/receive unit, customer premises equipment (CPE) other mobile or stationary device, or the like. For instance, in certain example embodiments, the method of FIG. 6 may include procedures or operations performed by the UE1 and/or UE2, as described or illustrated elsewhere herein, such as in FIGS. 1-5.

As illustrated in the example of FIG. 6, the method may include, at 605, receiving a configuration for PTM reception, e.g., MRB with PTM leg. For instance, in one embodiment, the receiving 605 of the configuration for PTM reception may include receiving the configuration for PTM reception of a group-common transport channel (e.g., multicast transport channel). The configuration for PTM reception of the group-common transport channel may include a group-common signaling configuration for a group of UEs. In one embodiment, the receiving 605 may include receiving the configuration via dedicated signaling for the UE (e.g., on a unicast channel). The configuration may include a radio network temporary identity (e.g., G-RNTI) for reception of the group-common transport channel. In an embodiment, the method may then include, at 610, receiving a PTM reconfiguration message using the group-common signaling configuration on the group-common transport channel from a network node, such as a gNB, gNB-DU, or core network node, or the like. In some examples, the PTM reconfiguration message may be a PTM RRC reconfiguration message, as shown in the examples of FIGS. 1-5. According to some embodiments, the PTM reconfiguration message may include an updated PTM configuration. In an embodiment, the group-common signaling configuration received at 605 may include a configuration of a group-common SRB (e.g., SRBx) for carrying the PTM reconfiguration message. According to certain embodiments, the group-common SRB may have its own logical identity. It is noted that the group-common SRB having its own logical channel identity allows multiplexing with other logical channels in one PTM transport block.

It should be appreciated that in some embodiments, a group-common SRB may not be configured. For example, if encryption and integrity protection is not configured for PTM and PDCP is not used, the group-common signaling configuration may comprise a configuration for a group-common signaling channel, rather than a group-common SRB, for carrying PTM reconfiguration. The group-common signaling channel may be detected by a UE using a same radio network temporary identity (e.g., G-RNTI), as that used for data receiving. Furthermore, the group-common signaling channel may be configured with one or more of the following: its own logical channel identity, radio link control protocol parameters, and/or packet data convergence protocol parameters. Alternatively or additionally, the group-common signaling channel configuration may be preconfigured and the network may signal to the UE whether the UE should be able to receive the group-common signaling channel according to the preconfigured parameters. Alternatively or additionally, the group-common signaling configuration may comprise assistance information related to detection of a group-common signaling, e.g., PTM reconfiguration for a group of UEs.

In an embodiment, the method may include determining a list of updated PTM configurations allowed to be carried using the group-common signaling configuration on the group-common transport channel.

According to some embodiments, the method may include, at 615, applying the updated PTM configuration for PTM reception. In an embodiment, the method may include determining a time point to apply the updated PTM configuration based on a received time indication (e.g., a time reference), and the applying 615 may include applying the updated PTM configuration at the determined time point. For example, according to an embodiment, upon reception of a PTM reconfiguration message on the group-common SRB, the UE does not reply with a (RRC) message but applies the updated PTM configuration from a time reference (e.g. system frame) indicated in the message received on the group-common transport channel. In some embodiments where the time reference is not received, the UE may apply the updated PTM configuration within a predetermined time limit. Alternatively or additionally, in response to a request for a reply included in the PTM reconfiguration message received on the group-common transport channel, the method may include transmitting a (RRC) reply message to the network node. In some embodiments, the method may include, at 620, receiving, from the network node on the group-common transport channel, PTM data. The PTM data may be received based on the updated PTM configuration. In some embodiments, where both the PTM reconfiguration message and the PTM data are received on the same group-common transport channel, the same radio network temporary identity (e.g., G-RNTI) may be used.

In certain embodiments, the method may include receiving, from the network node, a retransmission of the PTM reconfiguration message on the group-common transport channel, as shown in 110 and 310 of FIGS. 1 and 3. For instance, the retransmission may be a hybrid automatic repeat request (HARQ) retransmission and/or a retransmission of a PDCP PDU.

According to some embodiments, the configuration for PTM reception received at 605 and/or the PTM reconfiguration message received at 610 may include a PTM version flag to indicate a version of the PTM configuration carried in corresponding message. In certain embodiments, the version flag can have multiple values or multiple bits.

In one embodiment, the method may include receiving, from the network node on the group-common transport channel, an indication of a version of the PTM configuration that is in use. The version indication may be received in a MAC CE together with data reception, as shown in 112, 211, 312, 455, 530 of FIGS. 1-5. However, it should be appreciated that the version indication could also be received separately. According to certain embodiments, based on a detection that a PTM configuration of the indicated version was not received (e.g., due to misdetection of a PTM reconfiguration message), the method may include performing at least one of: refraining from performing uplink feedback related to the PTM data received at 620, and/or transmitting a request to the network node for the network node to provide the PTM configuration for the indicated version of the PTM configuration.

According to some embodiments, the method may include receiving, from the network node, an indication of a new PTM configuration version to be used before the updated PTM configuration is applied, and requesting, by the UE, the updated PTM configuration of the new PTM configuration version if the updated PTM configuration was not yet received. An example is shown in 212 and 213 of FIG. 2.

In certain embodiments, the method may include detecting, by the UE, an interruption of multicast data due to missed detection of a PTM configuration (e.g., at 313 of FIG. 3), and transmitting, by the UE, a request for the PTM configuration to the network node.

When describing FIG. 6, a network node is used as an example of a device for providing PTM configuration, reconfiguration and PTM data, but it should be appreciated that the network node could be replaced with a terminal device or a user equipment, for example.

Figure 7:
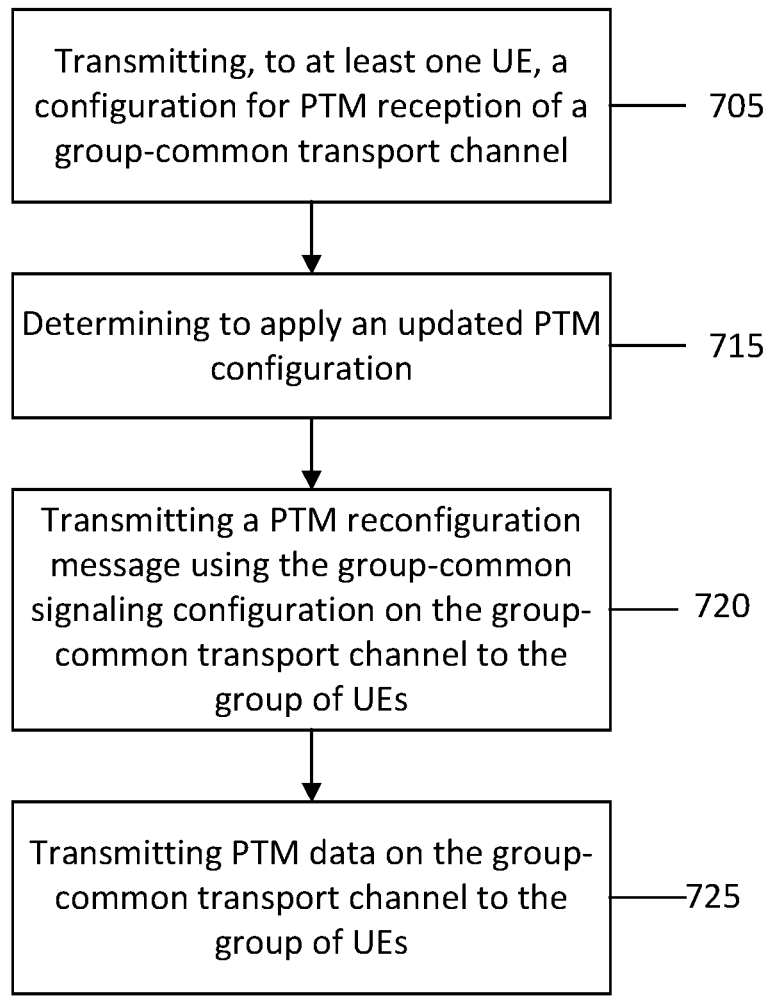
FIG. 7 illustrates an example flow diagram of a method, according to an embodiment.

FIG. 7 illustrates an example flow diagram of a method for configuring user devices or UEs for reception of PTM transmission, according to one embodiment. In certain example embodiments, the flow diagram of FIG. 7 may be performed by a device, e.g., a network entity or network node, or a communication device (e.g., a user equipment) in a communications system, such as LTE or 5G NR. In some example embodiments, the network entity performing the method of FIG. 7 (and operations discussed below) may include or be included in one or more of a base station, access node, node B, eNB, gNB, gNB-DU, gNB-CU, NG-RAN node, 5G node, transmission-reception points (TRPs), high altitude platform stations (HAPS), and/or relay station, or the like. For instance, in some embodiments, the method of FIG. 7 may include procedures or operations performed by a gNB, CN, DU and/or CU, as described or illustrated elsewhere herein, such as in FIGS. 1-5.

As illustrated in the example of FIG. 7, the method may include, at 705, transmitting, to at least one UE, a configuration for PTM reception of a group-common transport channel. According to an embodiment, the configuration for PTM reception may include a configuration of a group-common signaling configuration. The group-common signaling configuration provides information for detecting a group-common signaling (e.g., PTM reconfiguration message). In one example, the group-common signaling configuration comprises a configuration of a group-common SRB for carrying the PTM reconfiguration message for a group of UEs. According to an embodiment, the group-common SRB may be associated with a logical channel identity. In some embodiments, the transmitting 705 of the configuration for PTM reception may include transmitting the configuration, via dedicated signaling for the at least one UE (e.g., via unicast). In some embodiments, the configuration may include a radio network temporary identity (e.g., G-RNTI) for reception of the group-common transport channel.

According to an embodiment, the method of FIG. 7 may include, at 715, determining to apply an updated PTM configuration. In certain embodiments, the method may include, at 720, transmitting a PTM reconfiguration message (e.g., PTM RRC reconfiguration message) using the group-common signaling configuration on the group-common transport channel to the group of UEs. In certain embodiments, the PTM reconfiguration message may include the updated PTM configuration.

In an embodiment, at 725, the method may include transmitting PTM data on the group-common transport channel to the group of UEs.

According to one embodiment, the PTM reconfiguration message transmitted on the group-common transport channel may include a request for a reply from the at least one UE and, in this case, the method may include receiving a reply message from the at least one UE.

In an embodiment, the method may include providing, to the at least one UE, a retransmission of the PTM reconfiguration message on the group-common transport channel. The retransmission of the PTM reconfiguration message may be one of a HARQ retransmission and/or a retransmission of a PDCP PDU.

According to an embodiment, the configuration for PTM reception transmitted at 705 and/or the PTM reconfiguration message transmitted at 720 may include a PTM version flag to indicate a version of the PTM configuration carried in corresponding message, as shown in 103, 109, 303, 309 in FIGS. 1 and 3.

In one embodiment, the method may include transmitting, to the at least one UE on the group-common transport channel, an indication of a version of the PTM configuration that is in use. The indication may be transmitted in a MAC CE together with data, as shown in, e.g., 112 of FIG. 1.

According to an embodiment, when the indicated version of the PTM configuration was not received by the at least one UE, the method may include receiving a request, from the at least one UE, to provide the PTM configuration for the indicated version of the PTM configuration that is in use.

In some embodiments, the method may include transmitting, to the at least one UE, an indication of a new PTM configuration version to be used before the updated PTM configuration is applied (e.g., as shown at 211 in FIG. 2), and receiving a request, from the at least one UE, for the updated PTM configuration of the new PTM configuration version, if the updated PTM configuration was not yet received by the at least one UE.

According to an embodiment, when the network node applies the updated PTM configuration included in the PTM reconfiguration message and the at least one UE did not successfully receive the PTM reconfiguration message, the method may include receiving, from the at least one UE, a PTM configuration request for the PTM configuration. The PTM configuration request may be triggered at the UE by comparing a received version indication with the version in use (or to be used), or based on indication of data missing/interruption from upper layer.

In an embodiment, when encryption or integrity protection is configured for the new group-common signaling radio bearer (e.g., SRB4), new group specific security keys may be configured or specified. Alternatively, in an embodiment, when the encryption and integrity protection are not configured for the new signaling radio bearer, a list of possible updated PTM configurations carried via the new signaling radio bearer may be limited.

According to some embodiments, the network node may be configured in a distributed architecture such that the network node includes at least one DU and a CU. In this case, in one embodiment, the method may include determining, by the DU, to apply a new PTM configuration. For instance, in this embodiment, the determining 715 may include the DU determining to apply a new PTM configuration. In an embodiment, the method may then include the DU transmitting to the CU the new PTM configuration. According to some embodiments, the method may also include receiving, from the CU, a downlink message including the new PTM configuration, and at least one of a PTM configuration version and/or an indication of a time to apply the new PTM configuration. An example could be found in FIG. 4. In one embodiment, the method may further include applying, e.g., by the DU, the new PTM configuration at the time indicated in the downlink message.

According to a further embodiment, in which the network node may include at least one DU and a CU, the method may include determining, by the CU, to apply a new PTM configuration. For instance, in this embodiment, the determining 715 may include the CU determining to apply a new PTM configuration. In this embodiment, the method may then include the CU transmitting, to the DU, a downlink message comprising the new PTM configuration, and at least one of a PTM configuration version and/or an indication of a time to apply the new PTM configuration. An example could be found in FIG. 5. In an embodiment, the method may also include applying, e.g., by the CU, the new PTM configuration at the time indicated in the downlink message.

Figure 8:
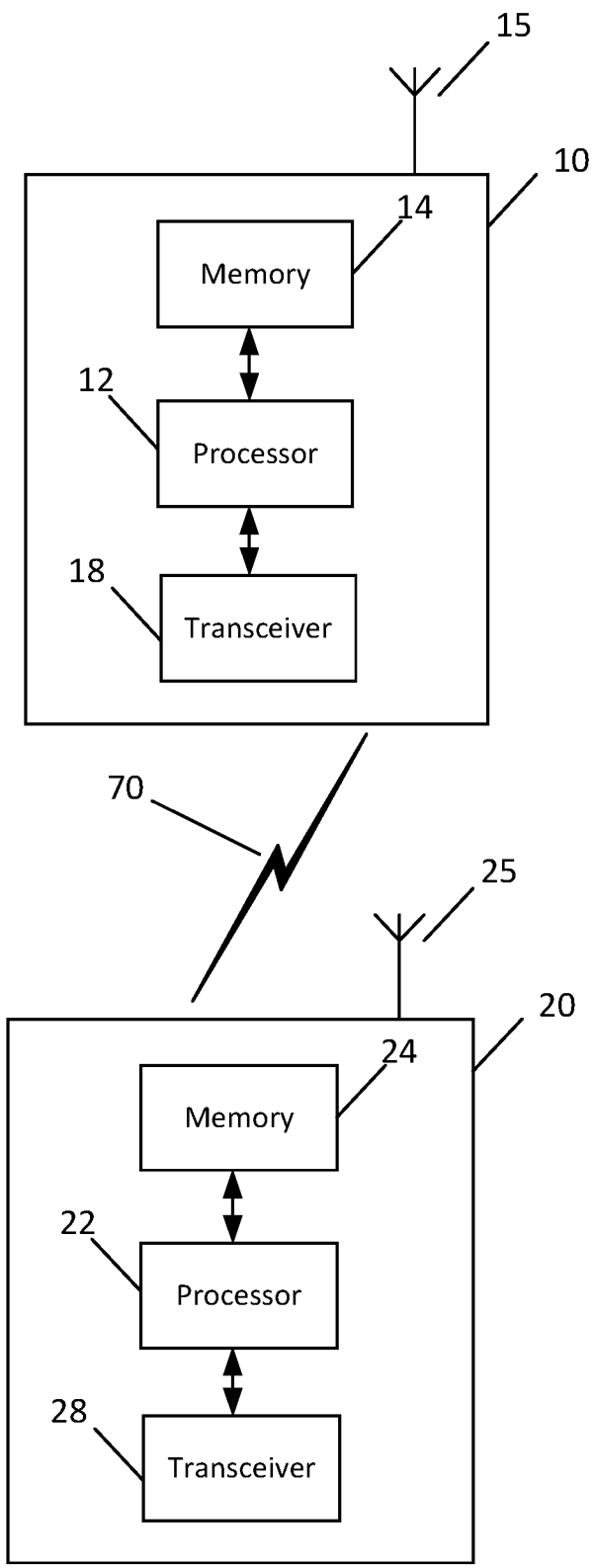
FIG. 8 illustrates an example of apparatuses, according to certain embodiments.

FIG. 8 illustrates an example of an apparatus 10 and apparatus 20, according to certain example embodiments. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, Remote Radio Head (RRH), integrated access and backhaul (IAB) node, and/or a WLAN access point, associated with a radio access network, such as a LTE network, 5G or NR. In some example embodiments, apparatus 10 may be gNB or other similar radio node, for instance. In some embodiments, apparatus 10 may be a device providing PTM configuration and PTM service. The device may be a user equipment in some embodiments.

It should be understood that, in some example embodiments, apparatus 10 may comprise an edge cloud server as a distributed computing system where the server and the radio node may be stand-alone apparatuses communicating with each other via a radio path or via a wired connection, or they may be located in a substantially same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8.

As illustrated in the example of FIG. 8, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 8, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RANI), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, Wireless Local Area Network (WLAN), Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry/means or control circuitry/means. In addition, in some embodiments, transceiver 18 may be included in or may form a part of transceiver circuitry/ means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be or may be a part of a network element or RAN node, such as a base station, access point, Node B, eNB, gNB, TRP, RRH, HAPS, IAB node, relay node, WLAN access point, satellite, or the like. In one example embodiment, apparatus 10 may be a HAPS or other aircraft having a radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-7, or any other method described herein. In some embodiments, as discussed herein, apparatus 10 may be configured to perform a procedure relating to configuring user devices for reception of PTM transmissions. For instance, in some embodiments, apparatus 10 may be controlled by memory 14 and processor 12 to configure one or more UEs for a new signaling radio bearer (e.g., SRBx or SRB4) for reception of PTM transmissions, as described elsewhere herein.

FIG. 8 further illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, CPE, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8.

As illustrated in the example of FIG. 8, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RANI), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as Orthogonal Frequency-Division Multiple Access (OFDMA) or Orthogonal Frequency Division Multiplexing (OFDM) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, CPE, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-7, or any other method described herein. For example, in an embodiment, apparatus 20 may be controlled to perform a process relating to reception of PTM transmissions, as described in detail elsewhere herein.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, sensors, circuits, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can improve and enhance at least the configuration of user devices or UEs for reception of PTM transmissions. For instance, some embodiments provide a more efficient method for PTM reconfiguration. As a result, example embodiments can reduce signaling, latency and/or power consumption. Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some functionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus comprising:
   at least one processor; and
   at least one memory storing instructions that, when executed by the at least one processor, cause the apparatus at least to:
   receive, from a device, a configuration for point-to-multipoint reception of a group-common transport channel, the configuration comprising a group-common signaling configuration for a group of user equipment, wherein the group-common signaling configuration comprises a configuration of a group-common signaling radio bearer for carrying the point-to-multipoint reconfiguration message;
   receive, a point-to-multipoint reconfiguration message using the group-common signaling configuration on the group-common transport channel from the device, wherein the point-to-multipoint reconfiguration message comprises an updated point-to-multipoint configuration; and
   receive point-to-multipoint data from the device on the group-common transport channel, based on the updated point-to-multipoint configuration.

2. The apparatus of claim 1, wherein:
   the group-common signaling configuration is configured with at least one of: a logical channel identity, radio link control parameters, or packet data convergence protocol parameters.

3. The apparatus of claim 1, wherein the at least one memory storing instructions and the at least one processor further cause the apparatus at least to:
   determine a time point to apply the updated point-to-multipoint configuration based on a received time indication; and
   apply the updated point-to-multipoint configuration at the determined time point for reception of the group-common transport channel.

4. The apparatus of claim 1, wherein the receiving of the configuration for point-to-multipoint reception comprises receiving the configuration for point-to-multipoint reception via a dedicated signaling for the apparatus, and the configuration comprises a radio network temporary identity for reception of the group-common transport channel.

5. The apparatus of claim 1, wherein the at least one memory storing instructions and the at least one processor further cause the apparatus at least to:
in response to a request for a reply included in the point-to-multipoint reconfiguration message, transmitting a reply message to the device.

6. The apparatus of claim 1, wherein at least one of the configuration for point-to-multipoint reception or the point-to-multipoint reconfiguration message comprises a version flag to indicate a version of point-to-multipoint configuration.

7. The apparatus of claim 1, wherein the at least one memory storing instructions and the at least one processor further cause the apparatus at least to:
receive, from the device on the group-common transport channel, an indication of a version of the point-to-multipoint configuration in use.

8. The apparatus of claim 7, wherein the at least one memory storing instructions and the at least one processor further cause the apparatus at least to:
based on a detection that a point-to-multipoint configuration of the indicated version was not received, perform at least one of:
refrain from performing uplink feedback related to the point-to-multipoint data; or
transmit a request to the device to provide the point-to-multipoint configuration for the indicated version.

9. The apparatus of claim 1, wherein the at least one memory storing instructions and the at least one processor further cause the apparatus at least to:
receive, from the device, an indication of a version of an updated point-to-multipoint configuration to be used before the updated point-to-multipoint configuration is applied; and
request, by the user equipment, the updated point-to-multipoint configuration, if the updated point-to-multipoint configuration was not received yet.

10. The apparatus of claim 1, wherein the at least one memory storing instructions and the at least one processor further cause the apparatus at least to perform:
detect an interruption of multicast data reception due to missed detection of a point-to-multipoint configuration; and
transmit a request for the point-to-multipoint configuration to the device.

11. The apparatus of claim 1, wherein the at least one memory storing instructions and the at least one processor further cause the apparatus at least to:
determine a list of updated point-to-multipoint configurations allowed to be carried using the group-common signaling configuration on the group-common transport channel.

12. An apparatus comprising:
at least one processor; and
at least one memory storing instructions that, when executed by the at least one processor, cause the apparatus at least to:
transmit to at least one user equipment, a configuration for point-to-multipoint reception of a group-common transport channel, the configuration comprising a group-common signaling configuration for a group of user equipment, wherein the group-common signaling configuration comprises a configuration of a group-common signaling radio bearer for carrying the point-to-multipoint reconfiguration message; and
transmit a point-to-multipoint reconfiguration message using the group-common signaling configuration on the group-common transport channel to the group of user equipment, wherein the point-to-multipoint reconfiguration message comprises an updated point-to-multipoint configuration; and
transmit point-to-multipoint data on the group-common transport channel.

13. The apparatus of claim 12, wherein the transmitting of the configuration for point-to-multipoint reception comprises transmitting the configuration, via a dedicated signaling for the at least one user equipment, and the configuration comprises a radio network temporary identity for reception of the group-common transport channel.

14. The apparatus of claim 12, wherein the at least one memory storing instructions and the at least one processor further cause the apparatus at least to:
provide a retransmission of the point-to-multipoint reconfiguration message on the group-common transport channel,
wherein the retransmission comprises a hybrid automatic repeat request retransmission or a retransmission of a packet data convergence protocol (PDCP) protocol data unit (PDU).

15. The apparatus of claim 12, wherein at least one of the configuration for point-to-multipoint reception or the point-to-multipoint reconfiguration message comprises a version flag to indicate a version of point-to-multipoint configuration.

16. The apparatus of claim 12, wherein the at least one memory storing instructions and the at least one processor further cause the apparatus at least to:
transmit, on the group-common transport channel, an indication of a version of the point-to-multipoint configuration in use or to be used.

17. The apparatus of claim 16, wherein the at least one memory storing instructions and the at least one processor further cause the apparatus at least to:
receive a request, from at least one user equipment, to provide the point-to-multipoint configuration for the indicated version or to provide an updated point-to-multipoint configuration.

18. A method, comprising:
receiving, at a user equipment from a device, a configuration for point-to-multipoint reception of a group-common transport channel, the configuration comprising a group-common signaling configuration for a group of user equipment, wherein the group-common signaling configuration comprises a configuration of a group-common signaling radio bearer for carrying the point-to-multipoint reconfiguration message;
receiving, at the user equipment, a point-to-multipoint reconfiguration message using the group-common signaling configuration on the group-common transport channel from the device, wherein the point-to-multipoint reconfiguration message comprises an updated point-to-multipoint configuration; and
receiving point-to-multipoint data from the device on the group-common transport channel, based on the updated point-to-multipoint configuration.

* * * * *